United States Patent Office 3,298,618
Patented Jan. 17, 1967

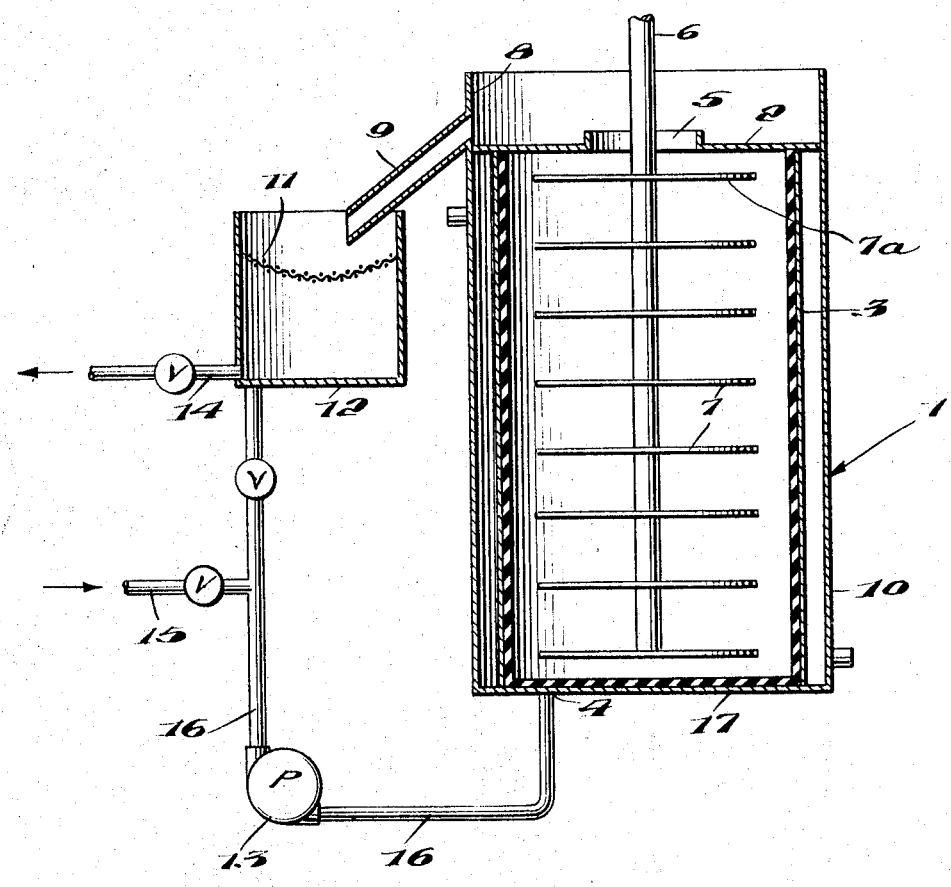

3,298,618
DISPERSING APPARATUS
Charles W. Talpey, Wilmington, Del., assignor to E. I. du Pont de Nemours and Company, Wilmington, Del., a corporation of Delaware
Filed Oct. 17, 1963, Ser. No. 317,010
3 Claims. (Cl. 241—46)

This invention relates to a new and improved milling process for dispersing solid particles in liquid media and/or reducing the size of solid particles and an improved milling apparatus suitable therefore.

Methods and apparatus for dispersing solid materials and reducing their particle size by agitating a dispersion of the solid material with sand are well knwon and widely used in the art as shown by Hochberg, U.S. Patents 2,581,414 and 2,855,156. The apparatus usually takes the form of an open topped circular container having therein a rotatable member for agitating the dispersion of sand and solid material. The rotatable member may take a number of forms as shown by Hochberg but the most successful has been a rotating shaft having attached thereto a plurality of circular disc impellers. In operation, a dispersion of the solid material is introduced continuously into the bottom of the apparatus while the rotatable member agitates the mixture with sand. The material passing into the top of the open apparatus passes through one or more screens mounted in the top of the circular container which collect the sand but allow the solid material now reduced in size to pass through. The sand adhering to the screen is periodically collected and returned to the device.

The present invention has as an object to provide an improved milling apparatus for grinding and dispersing solids in liquids. Another object is to provide an improved process for grinding and dispersing solids in liquids. A further object is to provide a simplified, more efficient milling apparatus and process characterized by a more constant milling rate, uniform particle size of discharged liquid dispersion, reduced vortexing of the dispersion and lessened maintenance for the milling apparatus.

These and other objects, which will become apparent as the description proceeds, are accomplished by continuously introducing a fluid dispersion of solid particles into the lower portion of a vertical hollow cylindrical vessel containing sand and subjecting the sand and dispersion to agitation by means of a rotating shaft extending downwardly into said vessel generally along the cylindrical axis thereof and having a plurality of impellers attached thereto and forcing the moving agitated dispersion and sand mixture against a suppressor plate and passing the dispersion, now free of sand, through an opening in the top wall of the cylindrical vessel.

In order to more clearly describe this invention, reference is made to the accompanying drawing which illustrates an embodiment of an apparatus suitable for carrying out the invention.

The drawing is a side elevation partly in section of a simple apparatus for batch or continuous operation.

Referring to the drawing, the apparatus for dispersing and reducing the particle size of solid materials comprises a cylindrical vessel 1 comprising top 2, hereinafter referred to as a suppression plate, continuous side wall 3, bottom 17 and having in the lower portion of the vessel inlet conduit 4 (shown here in the bottom). Through circular opening 5 in the suppression plate passes a motor driven agitator shaft 6 extending downwardly into the cylindrical vessel along the cylindrical axis thereof. Shaft 6 is provided with a plurality of impellers 7. The suppression plate is provided with raised edge 8 containing therein overflow spout 9. A water jacket 10 surrounds wall 3 for cooling purposes.

In operation, the reduction of particle size of solid material is accomplished by premixing the solid particulate material with the liquid vehicle into a dispersion. The proper amount of sand and dispersion is then charged into the milling vessel. The ratio of sand to dispersion can vary from about 30% to 65% sand to 70% to 35% dispersion by volume. The proper ratio is maintained by controlling the input rate of the dispersion so as to equal the output rate of the dispersion. Dispersion is introduced below the impellers through the inlet conduit. The dispersion is moved through line 16 by means of gravity or by pump 13 at sufficient pressure so the level within the apparatus is maintained so as to force a portion of the dispersion up through opening 5 in the suppression plate. Only pure dispersion essentially free of sand passes through the opening due to the horizontal motion imparted to the sand dispersion mixture contacting the suppression plate. The dispersion having passed up through the milling vessel and out over the suppression plate is discharged through overflow spout 9 through screen 11 into collector 12. The dispersion in collector 12 may then pass back into the milling vessel via pump 13 and line 16 or out of the collector via line 14. Fresh dispersion is added through line 15. If the process requires heating or cooling, a suitable heat exchange fluid may be circulated through water jacket 10.

The suppression plate and the other walls are preferably made of steel although they may be surfaced with rubber or the like. The impellers may be of any desired shape such as flat or curved circular discs, propellers, paddles or other stirring means with the exception that the uppermost impeller must be a flat or curved circular disc. Preferably, all the impellers are of the flat or curved circular disc variety. They are usually mounted approximately perpendicular to the agitator shaft. The number of impellers and their relative spacing is not critical provided the stirring arrangement is capable of imparting motion to the sand and dispersion throughout the milling vessel.

Only three dimensions are critical in the apparatus. In order to obtain proper agitation of the dispersion within the cylindrical container, the diameter of the impellers 7 must be a substantial proportion of the inner diameter of the cylindrical container such that motion will be imparted to sand particles located between the outer tip of the impeller and the side wall. In order that the device may function properly as explained herein below, the diameter of opening 5 should exceed the diameter of shaft 6 by a maximum of about two inches to avoid any appreciable sand carry over and the distance separating the top of top impeller 7a and the lower surface of suppression plate 2 may vary from a maximum of about one inch to a minimum of about one quarter inch. This spacing is maintained in order to impart sufficient motion to the dispersion to effectively separate sand from the dispersion near the upper shaft area.

A typical commercial embodiment of the device shown in the drawing has an inner diameter of about 12 inches with the inner surfaces of walls 17 and 2 separated by 48 inches. The shaft 6 is approximately one inch in diameter and the opening 5 approximately two inches in diameter. Eight impellers were equally spaced on shaft 6, the top impeller 7a being separated from the suppression plate 2 by approximately one inch. The rate at which the particle size of solid material is reduced (the rate of milling) is partially dependent on the relative amount of sand used. In general, it has been found preferable to use about two parts sand per one part solid material. The milling vessel may be filled with between about 30% to about 65% by volume of sand and more preferably between about 45% to 60% by volume of sand. The rate of milling also depends on the speed of rotation of shaft 6 and impellers 7. The amount of heat developed during agitation depends on a number of variables including the amount of solids in the dispersion. Since most solid materials have a minimum temperature at which re-agglomeration of the particles occurs, the speed of rotation must be limited so that the re-agglomeration temperature is not reached. The minimum speed of rotation required to obtain useful milling rates also depends on the size of the mill itself. However, generally in the 12 inch diameter embodiment described above, a minimum of about 880 r.p.m. is usually satisfactory.

The sand used in the present device is very abrasive and erodes the impellers rapidly if they are metal. For this reason it is preferable that the impellers be a relatively abrasion resistant material such as rubber or rubber coated metal. Suitable impellers are disclosed in British Patent 900,050. For the small ten inch impellers of the device described above, solid polyurethane rubber is preferable. Larger discs of rubber may not have sufficient rigidity and hence are preferably metal coated with polyurethane rubber.

While the 20–40 mesh "Ottawa sand" used in U.S. Patent 2,855,156 is the preferred grade of sand to use in the practice of this invention, the use of any sand within that range and of any origin will effect satisfactory grinding and produce satisfactory dispersions.

When a new batch of sand is used in the milling vessel, it often contains small amounts of sand more finely divided than desired. Screen 11 of about 80 mesh is provided to collect these "fines" which are discarded. After the apparatus has been in operation a short while, all of the "fines" are removed.

As mentioned above, the maximum rate of milling which can be used depends on the amount of solids and the nature of the material being milled due to possible reagglomeration. The total milling time also depends on these factors and on the original size of the solid and the final particle size desired. Continuous or batch operations may be conducted with the apparatus of this invention. In the batch operation, it is sometimes more efficient to recirculate the dispersion through the apparatus rather than leave a single batch in the apparatus until the desired particle size is attained. When operated in this manner, the fresh dispersion is pumped into the device via line 15 and enters line 16. Pumping of material is continued while the dispersion in the apparatus is agitated with sand causing the dispersion to overflow from the container via opening 5 and spout 9. At this point the addition of fresh material via line 15 is stopped and the overflow which collects in 12 is recirculated with pump 13. When the desired particle size is attained, the dispersion is withdrawn via line 14. If the solid material has a high re-agglomeration temperature such as with many high melting organic and inorganic pigments, a continuous process can be utilized since the agitation can be operated at a high rate of speed and only one pass through the device is necessary to reach the desired particle size. In continuous operation, fresh dispersion enters through line 15 while the agitated dispersion is removed via line 14. Those using the present device must determine the proper speed of agitation with each new material being milled. The size and type of sand used also has an effect on the rate of milling and the ultimate particle size attainable, for example, see the Hochberg patents cited above. As a general rule, the size of particles attainable decreases with the size of sand used. As stated above, for most purposes, 20–40 mesh sand is preferred but on occasion sand as fine as 70 mesh is profitably employed.

The present invention eliminates the screens of the prior art apparatus making it unnecessary to periodically shut down the grinding vessel to remove sand from the screens or to repair torn screens.

In addition to eliminating the screens of the art apparatus, the supprsession plate 2 and opening 5 serve other unuseful ends. Sand does not leave the area of agitation as in the art devices and hence the amount of sand remains constant. The milling rate of the present milling vessel thus remains constant while that of the art apparatus tends to decrease as sand is removed. The suppressor plate also controls to some extent the size of particles leaving via overflow dispersion. There is a maximum particle size for any particular material being milled which will leave the device via opening 5. The size depends on both the physical and chemical characteristics of the solid material itself, the rate of agitation and the annular size of opening 5. Since larger particles tend to remain within the cylindrical container, the efficiency of the apparatus is increased. The particles leaving the apparatus also tend to be more uniform in size. The larger particles which remain behind are eventually reduced in size and then leave via overflow. With some experimentation, the present milling vessel can often be operated to obtain the desired reduction in particle size in a single pass where two or more passes were required with the aparatus of the art. The suppression plate also reduces vortexing of dispersion, thus better restricting milled material and sand to the grinding area, and therefore, improving the milling rate.

EXAMPLE 1

A typical commercial use of the present milling vessel is carried out as follows: To the commercial milling vessel shown in the drawing having a 12 inch diameter and a 48 inch height was added 225 pounds of ASTM C-190 type sand of 20–30 mesh. Then an aqueous dispersion containing 35% by weight of a commercial blue dispersed dye of large particle size, about 80 to 100 microns, was pumped into the device until full. Agitation was started at 880 r.p.m. Pumping of the dispersion into the apparatus was reinitiated and agitation continued for about 1 hour. Overflow dispersion free of sand was collected and the particle size was found to be 4 microns.

EXAMPLE 2

A small mill having a diameter of 6 inches and a height between the bottom and the suppression plate of 6 inches was used. The milling vessel contained five circular disc impellers of 4¾ inches diameter evenly spaced along shaft 6 which had a diameter of ½ inch, 1 inch separated the lowest impeller from bottom 17 and 1 inch separated the top impeller from suppression plate 2. The annular opening in the suppression plate had a diameter of 1½ inches. In this apparatus were placed 5 lbs. of sand and 2½ lbs. of dye, the sand and dye being the same as used in Example 1. Agitation was carried out for about 4 hours at 770 r.p.m. The resulting dispersion was free of sand and had an average dye particle size of about ½ micron and a maximum particle size of 1–2 microns. The operating temperature stabilized at about 50° C. without external cooling.

The present device is particularly useful for reducing the particle size of organic dyes and pigments. It is also useful for preparing enamel and paint bases and other such materials such as those disclosed by Hochberg and the British patent cited above. The particle size of certain inorganic materials, particularly pigment such as titanium dioxide, also can be reduced by the present apparatus, but extremely hard inorganic materials which are as hard or harder than sand cannot be used.

The preceding representative examples may be varied with the scope of the present total specification disclosure, as understood and practiced by one skilled in the art to achieve essentailly the same results.

As many apparently widely different embodiments of this invention may be made without departing from the spirit and scope thereof, it is to be understood that this invention is not limited to the specific embodiments thereof except as defined in the appended claims.

What is claimed is:

1. An apparatus for grinding and dispersing particulate solids in liquids which comprises a vertical cylindrical vessel having an inlet in the lower portion thereof, an annular suppression plate mounted on top of said vessel, the opening in said suppression plate being generally centered therein, a rotatable member extending through said opening and into said vessel generally along the cylindrical axis of said vessel, a plurality of impellers within said vessel attached to said rotatable member, the diameter of said impellers being a substantial portion of the diameter of said vessel and the uppermost impeller being spaced from about ¼ inch to about 1 inch from the lower surface of said suppression plate, said opening in said suppression plate being of a diameter which will permit a substantial flow of a dispersion of said solids in said liquids through said opening when said suppression plate and said rotatable member are in operational relationship and said diameter of said opening being a maximum of about 2 inches larger than the diameter of said rotatable member.

2. An apparatus for grinding and dispersing particulate solids in liquids which comprises a vertical cylindrical vessel having an inlet in the bottom thereof, an annular suppression plate mounted on top of said vessel substantially perpendicular to the axis of said vessel, the opening in said suppression plate being generally centered therein, a rotatable member extending through said opening and into said vessel generally along the cylindrical axis of said vessel, a plurality of impellers within said vessel attached to said rotatable member, said impellers, when said rotatable member is rotated, being effective to agitate substantially all of the contents of said vessel and the uppermost impeller being spaced from about ¼ inch to about 1 inch from the lower surface of said suppression plate, said opening in said suppression plate being of a diameter which will permit a substantial flow of a dispersion of said solids in said liquids through said opening when said suppression plate and said rotatable member are in operational relationship and said diameter of said opening being a maximum of about 2 inches larger than the diameter of said rotatable member.

3. An apparatus for grinding and dispersing particulate solids which comprises a vertical cylindrical vessel having an inlet in the bottom thereof, a circular plate mounted on top of said vessel, said plate having a circular opening generally centered therein, a rotatable member extending through said opeining and into said vessel generally along the cylindrical axis of said vessel, a plurality of impellers within said vessel attached to said rotatable member, the diameter of said impellers being a substantial portion of the diameter of said vessel, the uppermost impeller being spaced from about ¼ inch to about 1 inch from the lower surface of said circular plate, the diameter of said opening in said plate being substantially larger than the diameter of said rotatable member and said diameter of said opening being a maximum of about 2 inches larger than the diameter of said rotatable member.

References Cited by the Examiner

UNITED STATES PATENTS

| | | | |
|---|---|---|---|
| 1,949,791 | 3/1934 | Epstein | 259—23 X |
| 2,361,503 | 10/1944 | Schutte | 259—23 X |
| 2,484,509 | 10/1949 | Hopkins | 241—46 |
| 2,779,752 | 1/1957 | Vining | 241—170 X |
| 3,079,993 | 3/1963 | Sweet | 259—8 X |
| 3,075,710 | 1/1963 | Feld | 241—16 |
| 3,134,549 | 3/1964 | Quackenbush | 241—74 |

WILLIAM W. DYER, Jr., *Primary Examiner.*

H. F. PEPPER, *Assistant Examiner.*